H. R. Dunham,
Reciprocating Steam Engine,
N° 5,032.
Patented Mar. 20, 1847.
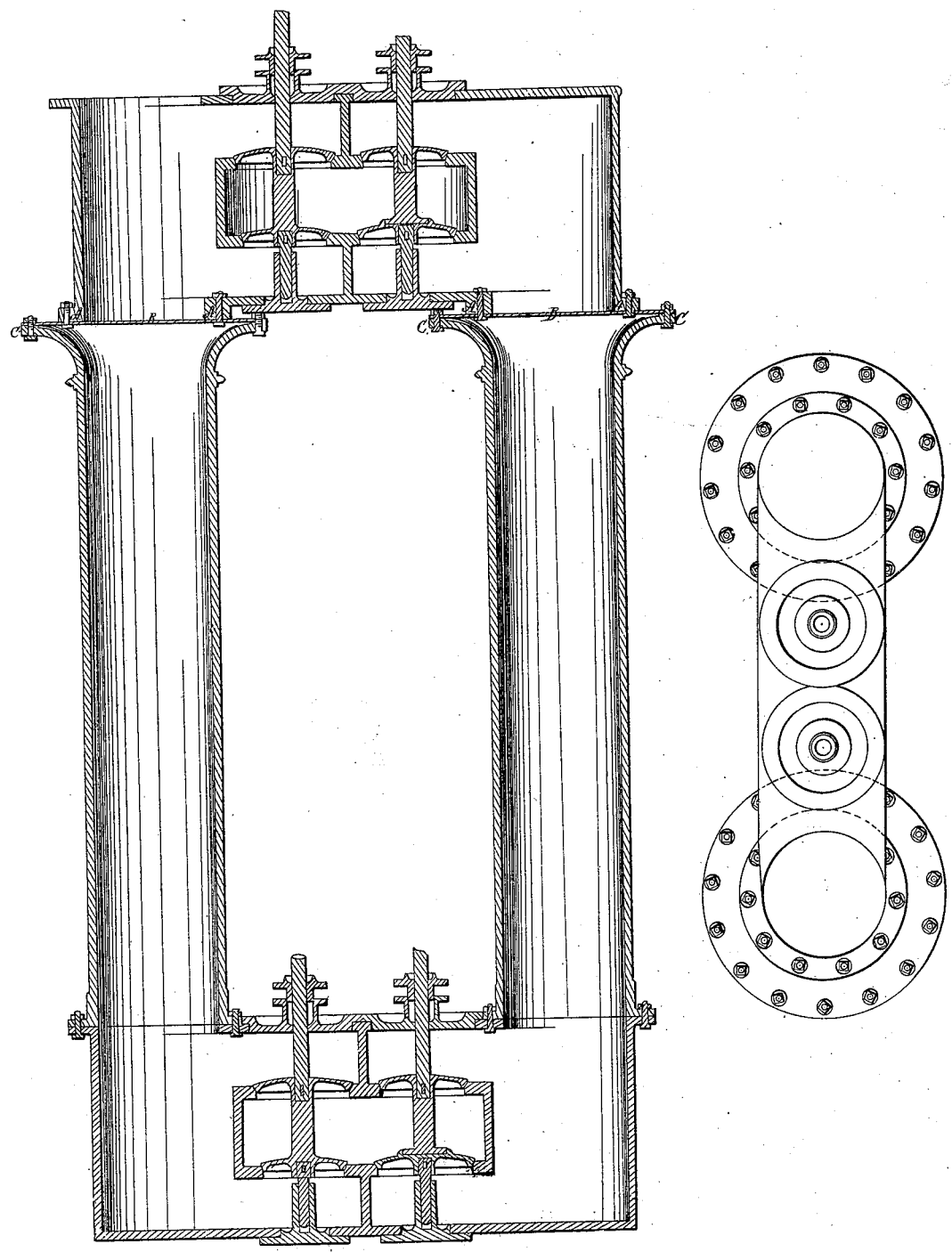

UNITED STATES PATENT OFFICE.

HENRY R. DUNHAM, OF NEW YORK, N. Y.

CONNECTING SIDE PIPES WITH STEAM-CHESTS.

Specification of Letters Patent No. 5,032, dated March 20, 1847.

*To all whom it may concern:*

Be it known that I, HENRY R. DUNHAM, of the city of New York, State of New York, have invented a new expansion-joint to be applied to side pipes of steam-engines and to all steam-pipes where a slight degree of expansion is required to be provided for; and I do hereby declare that the following is a correct description of the construction and operation of the same, reference being had to the drawing accompanying and making a part of this specification.

The ends of the pipes on the steam chest in the drawing marked A, I leave the usual size. For the purpose of providing for the expansion of the pipe I form the joint in the pipe by means of a plate from one fourth to three eighths of an inch thick of flexible metal marked B. This plate I make from eight to twelve inches larger in diameter, according to the size of the pipe, than the flanges of the pipe on the chest. This plate being perforated to the size of the opening of the pipe on the chest, the inner edge of the plate is bolted to the flanges on the steam chest and the outer edge is bolted to the flange of the side pipe marked C, to which side pipe I give a bell mouthed shape or any other form by which the heads of the bolts making the inner joint to the chest will clear the metal on the inside of the pipe. By this means, it will be seen, that by bolting the two flanges, one on the outside edge of the plate, and the other or opposite on the inside edge of the plate, the space between the bolts on the outer and inner edges of the plate, is left for the expansion of the pipe, the yielding of which plate affords all the room necessary to provide for the expansion of such side pipes.

What I claim as my invention and desire to secure by Letters Patent is—

The application of a plate of flexible metal in a steam pipe between two flanges of different diameters, the yielding of which plate shall give sufficient room for the expansion of the pipe, thereby avoiding the necessity of using stuffing boxes, or the ordinary copper hemispherical ring joint for side pipes of steam engines.

New York Feby. 26, 1847.

HENRY R. DUNHAM.

Witnesses:
S. I. SHUGERT,
H. H. SYLVESTER.